(12) United States Patent  (10) Patent No.: US 7,417,852 B2
Wong et al.  (45) Date of Patent: Aug. 26, 2008

(54) FRAME FOR NOTEBOOK COMPUTER

(75) Inventors: Tin-Lup Wong, Chapel Hill, NC (US); Seita Horikoshi, Zama (JP); Tetsuya Ohtani, Yokohama (JP); Hiroaki Agata, Yokohama (JP); Noboru Kodama, Yokahama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 507 days.

(21) Appl. No.: 11/184,628

(22) Filed: Jul. 19, 2005

(65) Prior Publication Data

US 2007/0019372 A1    Jan. 25, 2007

(51) Int. Cl.
 *G06F 1/16* (2006.01)
(52) U.S. Cl. ..................................... 361/683
(58) Field of Classification Search .................. 361/683
 See application file for complete search history.

(56) References Cited

U.S. PATENT DOCUMENTS

| | | | | |
|---|---|---|---|---|
| 5,600,538 | A * | 2/1997 | Xanthopoulos | 361/683 |
| 5,715,139 | A * | 2/1998 | Nakajima | 361/683 |
| 6,101,088 | A | 8/2000 | Nakajima et al. | 361/683 |
| 6,229,695 | B1 * | 5/2001 | Moon | 361/683 |
| 6,646,865 | B2 * | 11/2003 | Huang et al. | 361/683 |
| 6,995,975 | B2 * | 2/2006 | Hamada et al. | 361/680 |
| 7,075,785 | B2 * | 7/2006 | Minaguchi et al. | 361/683 |
| 2002/0085343 | A1 * | 7/2002 | Wu et al. | 361/683 |
| 2003/0210514 | A1 * | 11/2003 | Liu et al. | 361/683 |
| 2006/0002065 | A1 * | 1/2006 | Hua | 361/683 |
| 2006/0023406 | A1 * | 2/2006 | Shih et al. | 361/683 |

* cited by examiner

*Primary Examiner*—Lisa Lea-Edmonds
(74) *Attorney, Agent, or Firm*—John L. Rogitz

(57)  ABSTRACT

A unitary magnesium frame for a notebook computer includes a planar card support that isolates the planar card from external stresses applied to a base cover assembly that is engaged with the frame. A keyboard bezel assembly can cover the frame opposite to the base cover assembly. Various component-supporting structures of the frame are disclosed.

16 Claims, 5 Drawing Sheets

FRAME FOR NOTEBOOK COMPUTER

I. FIELD OF THE INVENTION

The present invention relates generally to frames for computers, and more particularly to frames for notebook or other portable computers.

II. BACKGROUND OF THE INVENTION

Notebook computers such as the device marketed under the trade name "Thinkpad" must have frames that support the various components in the computer. As critically recognized herein, owing to the portable use of such computers, the frame should accommodate several design considerations, including being sufficiently rugged to support planar computer cards in a way that any shock or flexure of the computer will not unduly harm the cards. Also, because of the way such computers are used the present invention understands that fluid drainage from the top, or keyboard side, of the computer through the frame is desirable, since users tend to spill liquids on notebook computers during use. Additionally, the present invention recognizes that ease of replacing various internal components such as hard disk drives (HDD) is desirable, as is the use of different housings that cover the frame.

SUMMARY OF THE INVENTION

A unitary computer frame that is configured for supporting internal components of a computer includes top, bottom, left, and right sides and an elongated, generally parallelepiped-shaped battery enclosure enclosed on at least two sides for holding one or more batteries. The battery enclosure is disposed along the top side and is parallel thereto. A solid bay plate is formed along the right side just below the battery enclosure, and the bay plate encompasses approximately an upper right quadrant of the frame. Also, a disk drive plate is contiguous to and below the bay plate, a touch pad opening is formed next to the disk drive plate, and a solid rectilinear support plate is next to the touch pad opening in a bottom left quadrant of the frame. An upper left quadrant of the frame is mostly open, and includes a relatively narrow fan support that is partially curvilinear and between the fan support and support plate a planar card opening is bounded by an elongated narrow top rail, elongated left and right rails, and a bottom rail that is contiguous to the top edge of the support plate. One or more card supports depend down from the rails of the planar card opening.

A grid structure may be formed between the bay plate and the openings of the fan support and planar card opening. The grid structure can include two parallel vertical rails and two parallel horizontal rails. A base cover assembly may be engaged with the frame and a planar card may be suspended from the card support, whereby external stress that might be applied on the base cover assembly is not transferred to the planar card. In some implementations, the base cover assembly envelops the sides of the frame and is formed with at least one detent that snaps into a slot of the frame. Also, a keyboard bezel assembly is engaged with the frame opposite the base cover assembly. The keyboard bezel assembly has at least one detent that snaps into a slot of the frame close to where the base cover assembly snaps in.

One or more hollow drain tubes can be formed on the frame and can extend between the keyboard bezel assembly and base cover assembly for draining liquid spilled on the keyboard bezel assembly to the base cover assembly. Holes may be formed in the base cover assembly directly below the drain tubes for engaging respective fasteners to hold a stand onto the frame. Plural vent holes may be formed in the battery enclosure for venting heat and gas from the battery, and a cooling air opening can be formed in approximately one-quarter of the disk drive plate.

In another aspect, a computer includes internal components and a frame supporting the internal components. A keyboard bezel assembly and a base cover assembly sandwich the frame. At least one of the internal components is substantially isolated from external stress that might be applied on the base cover assembly.

In still another aspect, a computer system includes plural computer components and a single unitary frame holding the components. The frame includes means for supporting at least one planar card such that the card is isolated from external stresses applied to the frame. The frame also includes means for holding and venting at least one battery, and first means for engaging a keyboard support bezel. Second means are opposed to the first means for engaging a base cover assembly.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
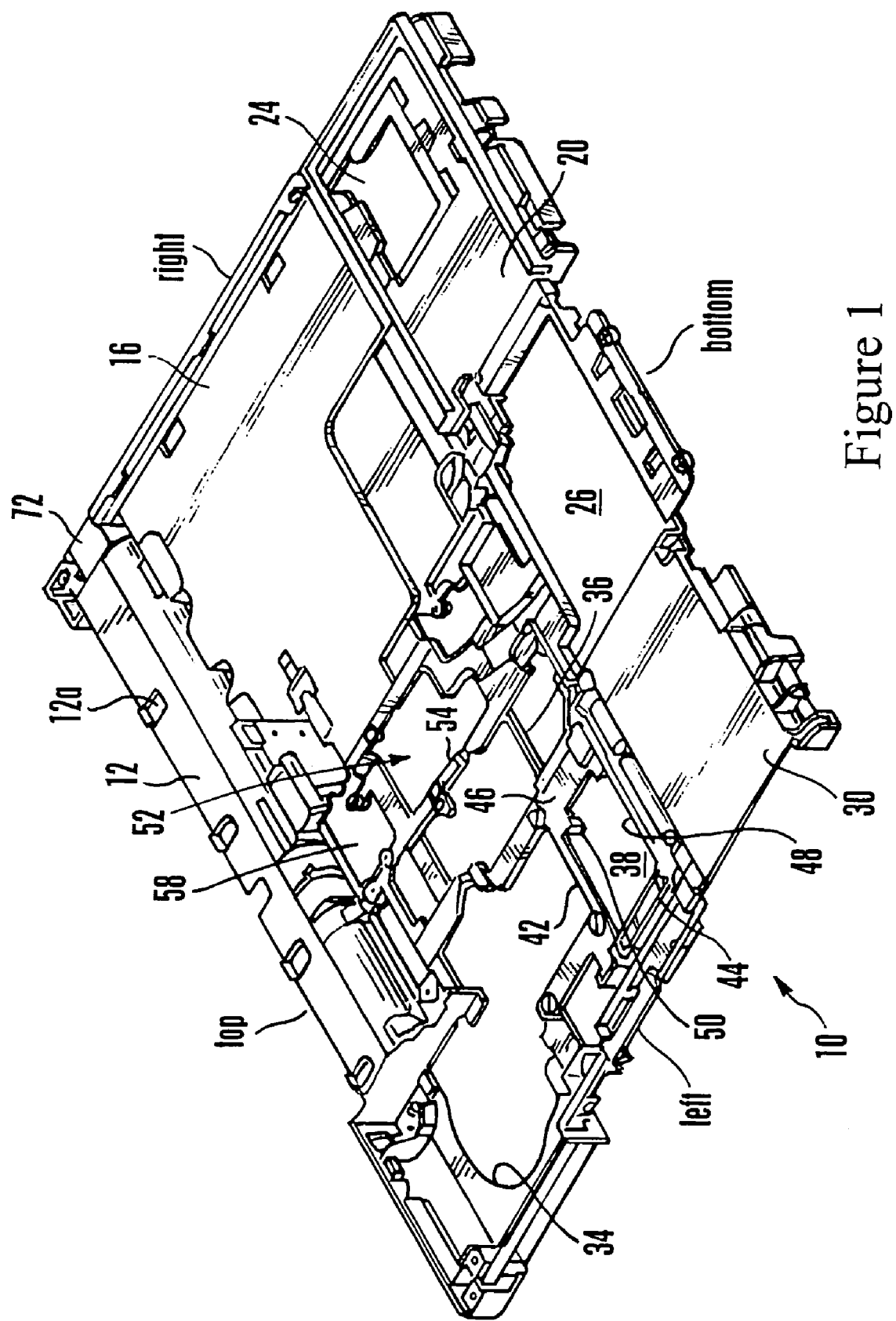
FIG. 1 is a perspective view of the present computer frame.

Referring initially to FIG. 1, a computer frame is shown, generally designated 10, which is unitarily made by, e.g., stamping or other process and which may be made of a relatively rigid material such as magnesium or magnesium alloy. The frame 10 is generally parallelepiped in shape as shown. Accordingly, the frame 10 has four edges, labelled "top", "bottom", "left", and "right" as shown, it being understood that these terms are for ease of exposition only and do not limit the orientation of the frame 10 in practice.

Figure 2:
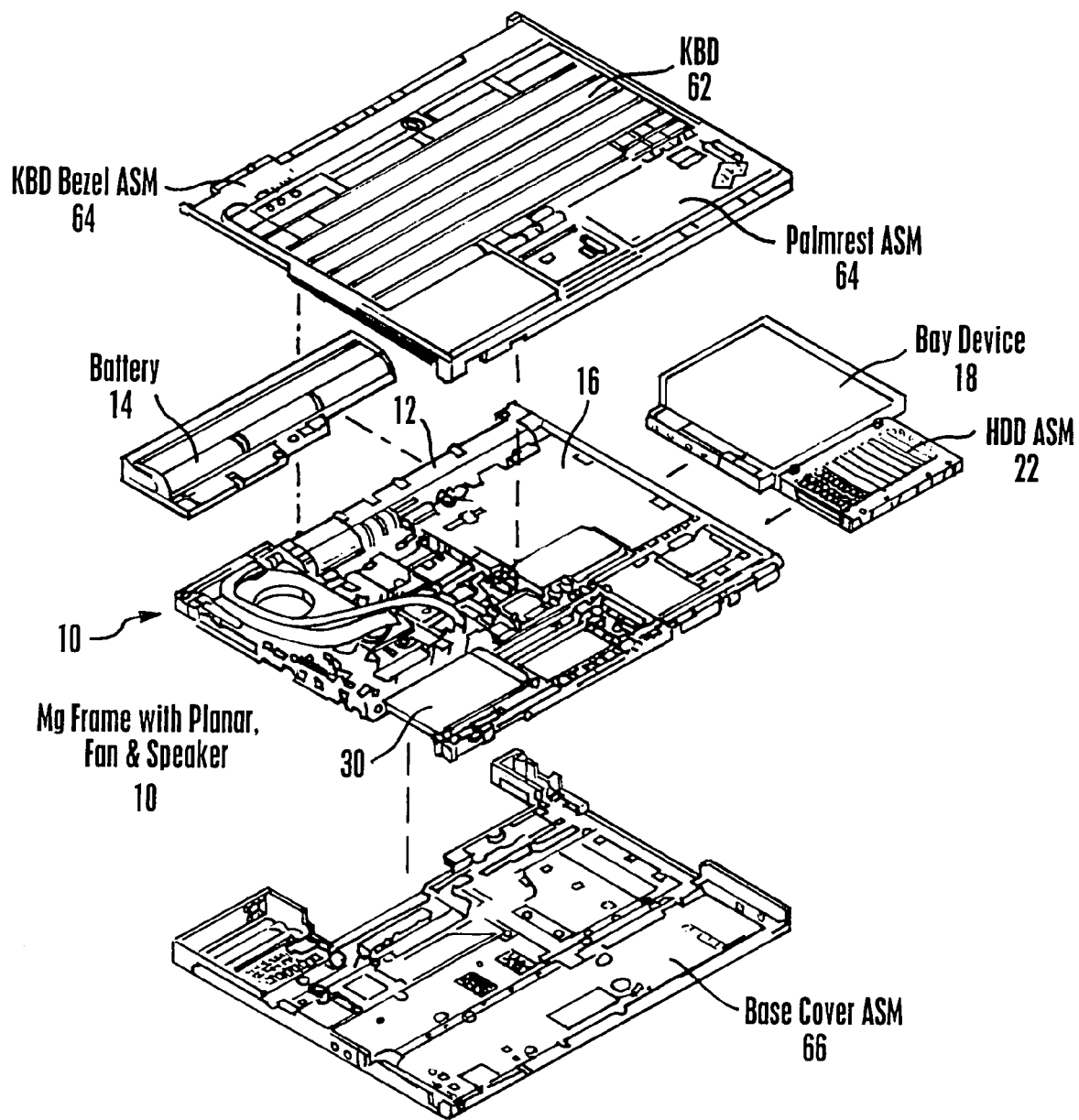
FIG. 2 is an exploded perspective view showing some of the components exploded away from the frame and some of the components engaged with the frame.
Figure 3:
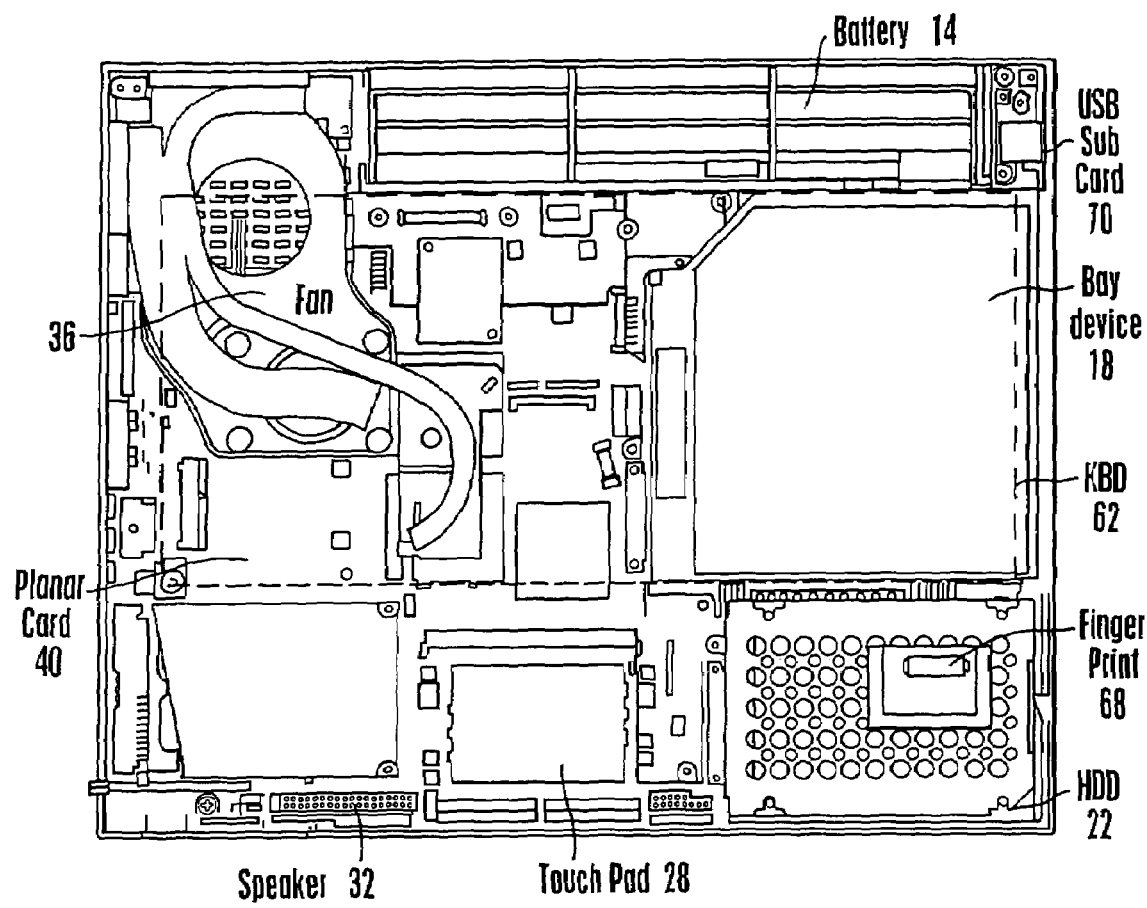
FIG. 3 is a top plan view of the frame with components with the keyboard outline shown in phantom and with the base cover assembly removed for clarity.

In cross-reference to FIGS. 1-3, the frame 10 is configured for supporting various internal components of a computer, such as, e.g., a fourteen inch (14") notebook computer. With more specificity, the frame 10 is formed with an elongated, generally parallelepiped-shaped battery enclosure 12 that is enclosed on at least two sides as shown, and one or more batteries 14 can be disposed in the battery enclosure 12. The battery enclosure 12 may be disposed along the top edge of the frame 10 as shown and parallel thereto. Plural vent holes 12a may be formed in the top of the battery enclosure 12 as shown along the top edge of the frame 10 for venting heat and gas from the battery.

Additionally, as shown in FIGS. 1 and 2 along its right side just below the battery enclosure 12 the frame 10 is formed with a solid bay plate 16 which covers approximately one quarter (the upper right quadrant) of the frame 12. A bay device 18 which may be, e.g., a peripheral computer device is supported on the bay plate 16. Contiguous to and below the bay plate 16 is a disk drive plate 20 on which a HDD 22 may be supported. The disk drive plate 20 may be a solid parallelepiped-shaped planar structure as shown except for a cooling air opening 24 formed in approximately one-quarter of the disk drive plate 20. Accordingly, the HDD 22 is isolated on the disk drive plate 20 and is easily replaced, owing to its ready access on the disk drive plate 20.

Proceeding to the left along the bottom edge of the frame 10, a touch pad opening 26 is formed that is approximately the size of the disk drive plate 20. A touch pad 28 may be mounted over the opening 26. Next to the touch pad opening 26 in the bottom left quadrant of the frame 10 is a solid rectilinear support plate 30 for holding, e.g., a speaker 32.

The upper left quadrant of the frame 10 is mostly open, and includes a relatively narrow fan support 34 that is partially curvilinear as shown for engaging a cooling fan 36 (FIG. 3). Between the fan support 34 and support plate 30 is a planar card opening 38 in which a planar card 40, which may include a microprocessor chip, is mounted in accordance with disclosure below. The planar card opening 38 is bounded by an elongated narrow top rail 42, somewhat broader but still elongated left and right rails 44, 46, and a bottom rail 48 that is contiguous to the top edge of the support plate 30 as best shown in FIG. 1. As intended herein, one or more card supports 50 depend down from the rails of the planar card opening 38 for purposes to be shortly disclosed. The rails 42-48, like the other elongated rail-like structures of the frame, may be L-shaped or T-shaped in transverse cross-section for strength.

Between the bay plate 16 and the openings of the fan support 34 and planar card opening 38, a grid-like structure 52 is formed which is composed of two parallel vertical rails 54 and two parallel horizontal rails 56, which, in cooperation with bounding structure, forms six openings 58 as shown. As best shown in FIG. 2, the frame 10 may be sandwiched between, on the one hand, a solid rectilinear keyboard bezel assembly 60 containing a keyboard 62 and palm rest assembly 64, and a solid base cover assembly 66 on the other hand. It is to be understood that while several components are described above as being supported by the frame 10, other and/or different components may also be included, e.g., a finger print reader 68 may be juxtaposed with the HDD 22 as shown in FIG. 3, and a universal serial bus (USB) connector card 70 may be juxtaposed with the battery 14, with a small USB enclosure 72 (FIG. 1) being formed as part of the frame 10 to accommodate the USB card 70.

Figure 4:
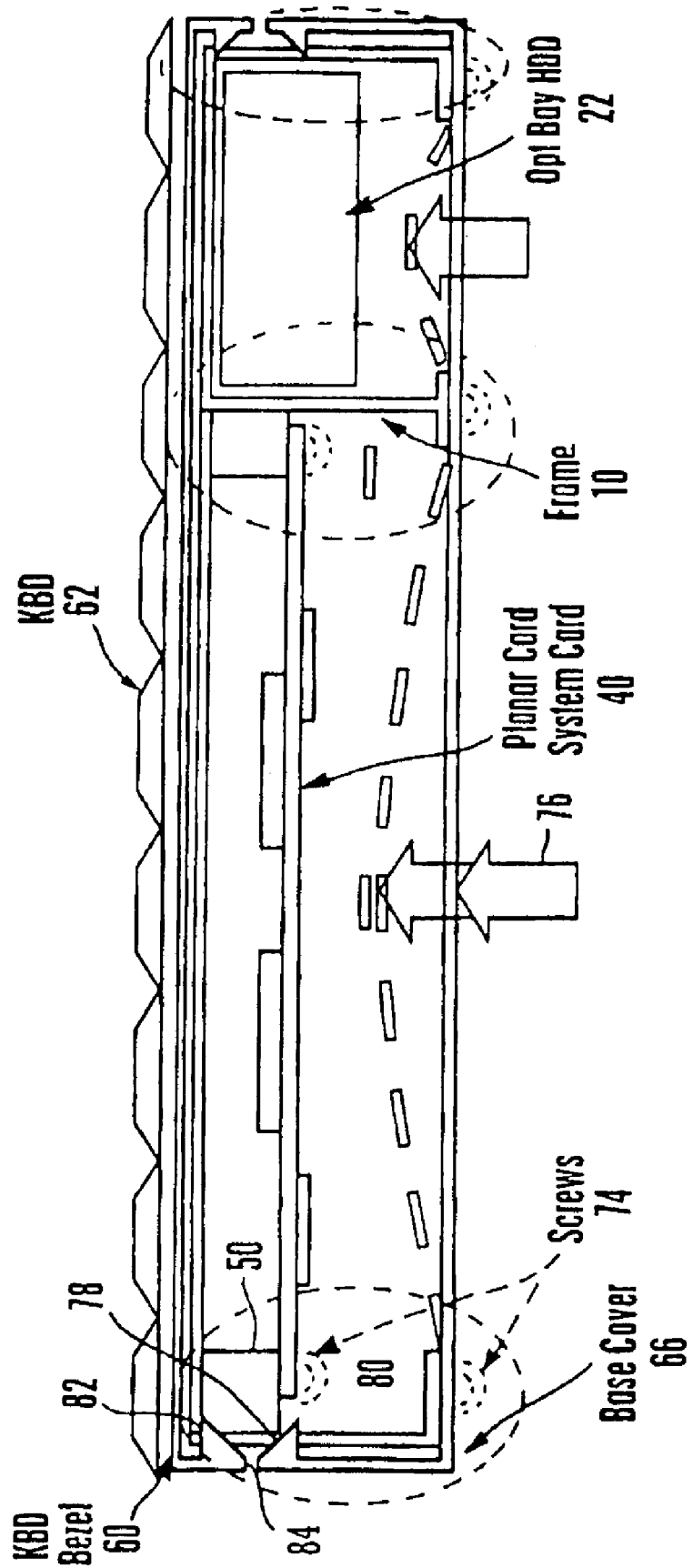
FIG. 4 is a side view of the frame, schematically illustrating flexure due to an external force and illustrating how a planar card is mounted in the frame to shield it from the flexure.

FIG. 4 best shows that as mentioned above, the planar card 40 is suspended from the card supports 50, above the bottom of the base cover assembly 66. The engagement may be effected by screws 74. In this way, external stress, indicated by the arrows 76, that might be applied on the base cover assembly 66 (i.e., the surface of the notebook computer that is opposed to the keyboard and, hence, that establishes the bottom of the computer) is not transferred to the planar card 40.

Also, the base cover assembly 66 may envelop the sides of the frame 10 as shown and may be affixed thereto by screws 74. The base cover assembly 66 may further be formed with a detent 78 that snaps into a slot 80 of the frame 10. Likewise, the keyboard bezel assembly 60 may have a detent 82 that snaps into a slot 84 of the frame 10 very close to where the base cover assembly 66 snaps in. This easy snapping engagement facilitates the use, with a single frame model, of various customized base cover assemblies 66 and keyboard bezel assemblies 60, e.g., with different skins, colors, etc.

Figure 5:
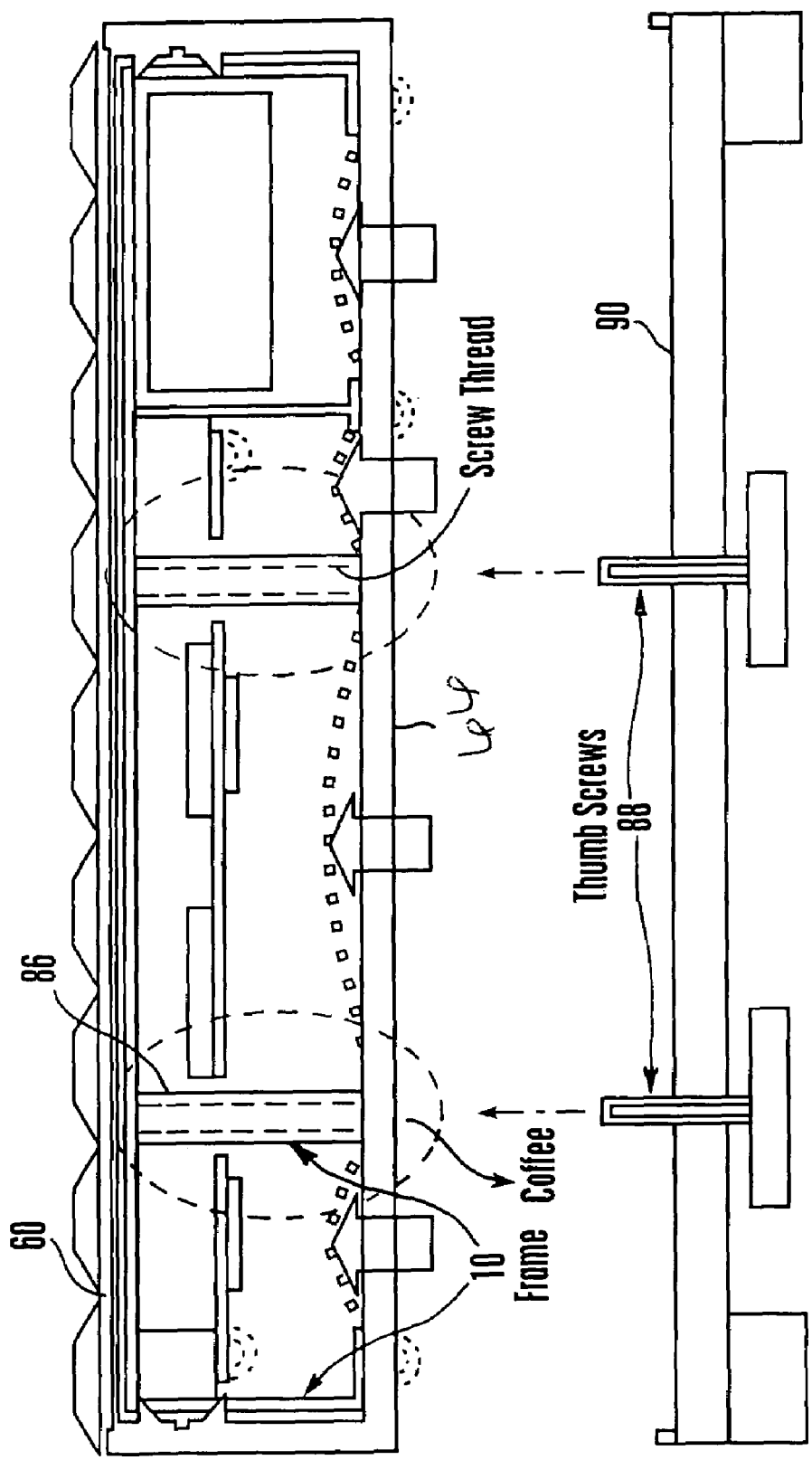
FIG. 5 is a side view of the frame in the dimension orthogonal to that shown in FIG. 4, schematically illustrating flexure due to an external force and illustrating drainage structure through the frame.

FIG. 5 shows a view that is orthogonal to that shown in FIG. 4, showing that the frame 10 may be formed with one or more hollow drain tubes 86 that may if desired be internally threaded for receiving screws. The drain tubes 86 extend between the keyboard bezel assembly 60 and base cover assembly as shown so that, for instance, if coffee is spilled on the keyboard, it drains through one or more of the drain tubes 86 past the components in the frame 10 and to the base cover assembly 66. If desired, holes may be formed in the base cover assembly 66 directly below the drain tubes 86 and thumbscrews 88 or other fasteners can engage the holes to hold a stand 90 onto the frame 10.

While the particular FRAME FOR NOTEBOOK COMPUTER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A unitary computer frame configured for supporting internal components of a computer, comprising:
   top, bottom, left, and right sides;
   an elongated, generally parallelepiped-shaped battery enclosure enclosed on at least two sides for holding one or more batteries, the battery enclosure being disposed along the top side and parallel thereto;
   a solid bay plate formed along the right side just below the battery enclosure, the bay plate encompassing approximately an upper right quadrant of the frame;
   a disk drive plate contiguous to and below the bay plate;
   a touch pad opening formed next to the disk drive plate;
   a solid rectilinear support plate next to the touch pad opening in a bottom left quadrant of the frame, wherein
      an upper left quadrant of the frame is mostly open, and includes a relatively narrow fan support that is partially curvilinear and between the fan support and support plate a planar card opening bounded by an elongated narrow top rail, elongated left and right rails, and a bottom rail that is contiguous to the top edge of the support plate, one or more card supports depending down from the rails of the planar card opening.

2. The frame of claim 1, comprising a grid structure between the bay plate and the openings of the fan support and planar card opening, the grid structure including two parallel vertical rails and two parallel horizontal rails.

3. The frame of claim 1, comprising a base cover assembly engaged with the frame and a planar card suspended from the card support, whereby external stress that might be applied on the base cover assembly is not transferred to the planar card.

4. The frame of claim 3, wherein the base cover assembly envelops the sides of the frame, the base cover assembly being formed with at least one detent that snaps into a slot of the frame.

5. The frame of claim 4, further comprising a keyboard bezel assembly engaged with the frame opposite the base cover assembly, the keyboard bezel assembly having at least one detent that snaps into a slot of the frame close to where the base cover assembly snaps in.

6. The frame of claim 4, comprising one or more hollow drain tubes formed on the frame and extending between the keyboard bezel assembly and base cover assembly for draining liquid spilled on the keyboard bezel assembly to the base cover assembly.

7. The frame of claim 6, further comprising respective holes formed in the base cover assembly directly below the drain tubes for engaging respective fasteners to hold a stand onto the frame.

8. The frame of claim 1, wherein the frame is made of magnesium.

9. The frame of claim 1, comprising plural vent holes formed in the battery enclosure for venting heat and gas from the battery.

10. The frame of claim 1, comprising at least one cooling air opening formed in approximately one-quarter of the disk drive plate.

11. A computer, comprising:
    internal components;
    a frame supporting the internal components;
    a keyboard bezel assembly and a base cover assembly sandwiching the frame; wherein at least one of the internal components is substantially isolated from external stress that might be applied on the base cover assembly, wherein the frame comprises:
    a solid bay plate encompassing approximately a quadrant of the frame;
    a disk drive plate; and
    a touch pad opening.

12. The computer of claim 11, wherein the at least one of the internal components is a planar card.

13. The computer of claim 11, wherein the frame comprises:
    top, bottom, left, and right sides; and
    an elongated, generally parallelepiped-shaped battery enclosure enclosed on at least two sides for holding one or more batteries.

14. The computer of claim 13, comprising plural vent holes formed in the battery enclosure for venting heat and gas from the battery.

15. The computer of claim 11, comprising one or more hollow drain tubes formed on the frame and extending between the keyboard bezel assembly and base cover assembly for draining liquid spilled on the keyboard bezel assembly to the base cover assembly.

16. A computer, comprising:
    internal components;
    a frame supporting the internal components;
    a keyboard bezel assembly and a base cover assembly sandwiching the frame; wherein at least one of the internal components is substantially isolated from external stress that might be applied on the base cover assembly; and
    a solid rectilinear support plate, a quadrant of the frame being mostly open and including a relatively narrow fan support that is partially curvilinear and between the fan support and support plate a planar card opening bounded by an elongated narrow top rail, elongated left and right rails, and a bottom rail, one or more card supports depending down from the rails of the planar card opening.

* * * * *